Figures 1, 2:
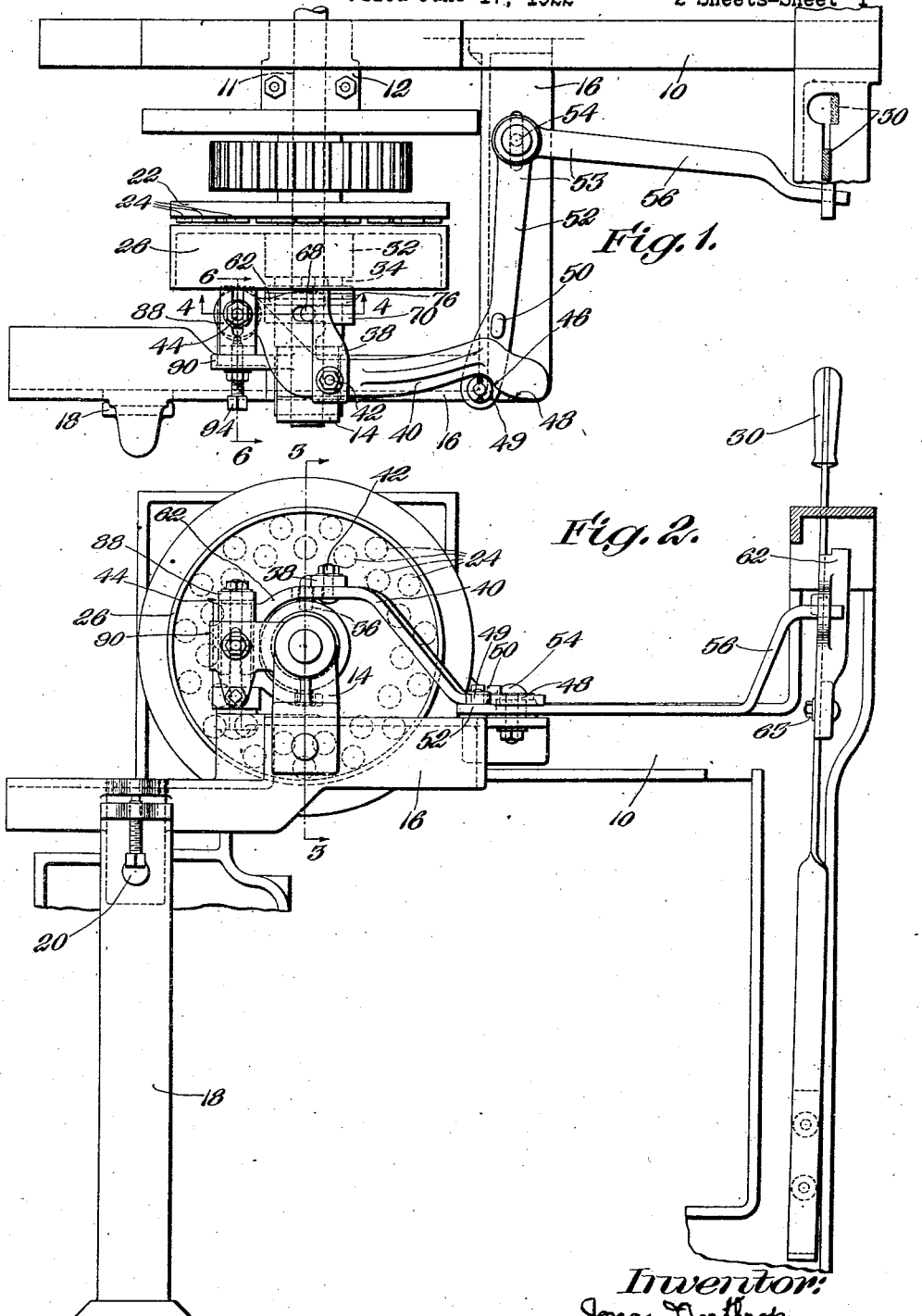

April 17, 1928.

J. NORTHROP 1,666,717

CLUTCH MECHANISM FOR LOOMS

Filed June 17, 1922 2 Sheets-Sheet 1

Witness:
Alfred H. McGlinchey

Inventor:
Jonas Northrop
by his attorneys
Van Everen Fish Hildreth & Cary

April 17, 1928.
J. NORTHROP
1,666,717
CLUTCH MECHANISM FOR LOOMS
Filed June 17, 1922
2 Sheets-Sheet 2
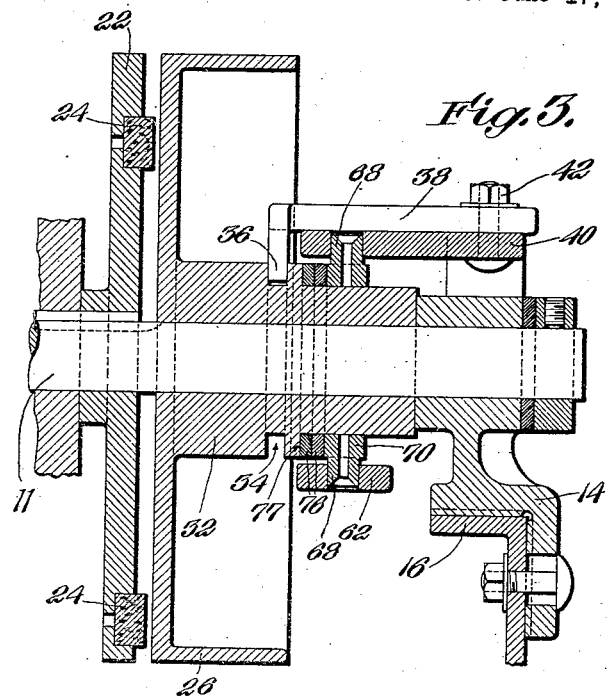
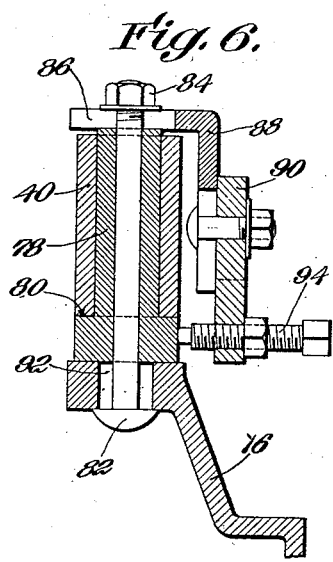
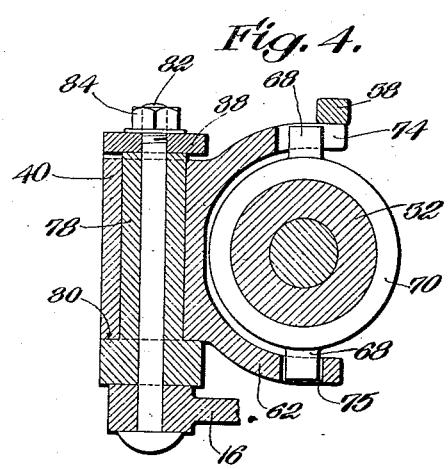
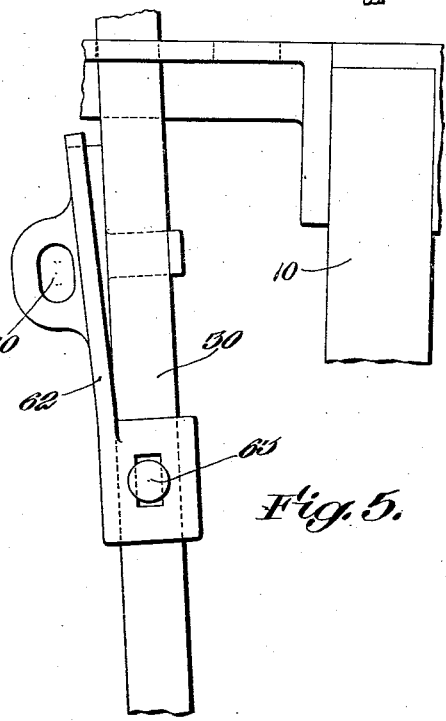
Witness:
Alfred H. McGlinchey
Inventor:
Jonas Northrop
by his attorneys
Van Everen Fish Hildreth & Cary Patented Apr. 17, 1928.

1,666,717

UNITED STATES PATENT OFFICE.

JONAS NORTHROP, OF HOPEDALE, MASSACHUSETTS, ASSIGNOR, BY MESNE ASSIGNMENTS, TO DRAPER CORPORATION, OF HOPEDALE, MASSACHUSETTS, A CORPORATION OF MAINE.

CLUTCH MECHANISM FOR LOOMS.

Application filed June 17, 1922. Serial No. 569,107.

This invention relates to an improvement in clutch mechanism for looms.

The object of the invention is to reorganize and improve the clutch mechanism for looms, more particularly with respect to the mechanism for stopping and starting the loom. To the above end, the present invention consists in the improved clutch mechanism for looms hereinafter described and particularly defined in the claims.

In the accompanyng drawings illustrating the preferred form of the invention, Fig. 1 is a plan of one end portion of the loom, showing the improved mechanism for stopping and starting the loom; Fig. 2 is an end elevation of the portion shown in Fig. 1; Fig. 3 is a vertical section on the line 3—3 of Fig. 2; Fig. 4 is a vertical sectional detail on the line 4—4 of Fig. 1; Fig. 5 is a detail in front elevation showing the construction of knock-off lever; and Fig. 6 is a vertical sectional detail on the line 6—6 of Fig. 1.

The illustrated embodiment of the invention is described as follows: The end frame 10 of the loom is of the usual construction, having a bearing 12 in which the crank shaft or lay shaft 11 is journaled. The outer end of the lay shaft 11 is supported in an outboard bearing 14, secured to and supported by a bracket 16 bolted to the end frame 10, and supported upon the auxiliary strut 18, as shown in Fig. 2. A threaded bolt 20 is provided for the purpose of insuring the maintenance of the out-board bearing 14 at the proper level to secure alinement of the crank or lay shaft 11. A clutch disk 22 is keyed or otherwise secured to the lay shaft 11 to rotate therewith, and is provided on its outer surface with a plurality of friction disks 24, preferably cork, arranged in double rows, as shown in dotted lines in Fig. 2. A loose pulley 26 is adapted to be driven by a belt, not shown, and provision is made for moving the loose pulley 26 axially of the lay shaft 11 into engagement with the friction disks 24 upon the surface of the disk 22 in order to transmit power from the pulley 26 to the lay shaft 11.

The movements of the loose pulley 26 axially of the lay shaft 11 into and out of engagement with the clutch disk 22 are controlled by movements of a knock-off lever 30, by mechanism which is described as follows: The hub 32 of the loose pulley is provided with an annular groove 34 in which is loosely received a finger 36 depending from a de-clutching arm 38, secured in fixed relation to a clutch lever 40 by a bolt 42, the lever 40 being pivoted, as will be described at 44, see Fig. 1. The end of the clutch lever 40 is shaped to form cam surfaces 46, 48, which cooperate with a cam roll 49 and cam lug 50, both upon the end of one arm 52 of a bell crank lever 53, pivoted at 54 upon the bracket 16. The second arm 56 of the bell crank is extended through a slot 60 in a casting 62 secured to the knock-off lever by a stud bolt 63. The end of the lever 40 remote from the cam surfaces 46, 48, is shaped as shown in Fig. 1, and in detail in Fig. 4, having a yoke shaped piece 62 embracing the extended end of the hub 32 of the pulley 26. Pins 68 projecting from a collar 70, loosely mounted upon the extended portion of the hub 32, are received within a slot 74 and hole 75 in the upper and lower members of the yoke, respectively, see Figs. 3 and 4. Fibre washers 76 are interposed between the collar 70 and a shoulder 77 upon the hub 32 of the pulley.

The clutch lever 40 is provided with a bearing portion mounted upon the hollow stud 78, which latter is provided with a shoulder 80 for supporting the lever 40 in position. The stud 78 is penetrated by a bolt 82, which is provided with a nut 84. The bolt 82 is received in a slot 86 in the angle bracket 88, in turn secured to the plate 90 projected rearwardly from the side of the bearing 14, as shown in Fig. 6, and the lower end of the bolt 82 is received in the slot 92, which is formed in a laterally extended portion of the bracket 16. By loosening the nut 84, the pivot stud 78 may be adjusted laterally to correct position to operate the clutch properly, an adjusting bolt 94 being used to move the stud 78 inwardly to adjusted position where it will be secured in place by screwing up the nut 84. The bolt 94 is provided with a check nut for locking it in place.

The bell crank lever 53 is operated from the knock-off lever 30, and the cam surface 46 with which the cam roll 49 engages, is abrupt so that when the knock-off lever is pulled upon to close the clutch, the oscillation imparted to the clutch lever 40 by the knock-off lever is of greater amplitude than that of the bell crank lever 53, but after the clutch has been moved to bring the clutch surfaces in contact, a considerable movement of the knock-off lever 30 is required to move the cam roll 49 over the cam surface 48 of the clutch lever 40, so that the leverage employed to close the clutch with driving pressure is great, and the operative, without great strength, can close the clutch and start the loom, because of the leverage during the closing movement of the clutch lever. The end of the cam surface 48 is substantially radial to the pivot of the bell crank lever for the purpose of locking the latter closed. The cam surfaces 46 and 48 comprise a self locking cam. When the loom is knock-off by disengaging the knock-off lever from its notch, the bell crank lever 53 moves in the opposite direction, and the cam lug 50 engages the opposite side of the clutch lever 40, and pushes it in a direction to open the clutch. The declutching arm 38 pulls the movable clutch member out of engagement with the driving disk of the loom.

It is to be understood that the invention may be embodied in other forms within the scope of the following claims.

Having thus described the invention, what is claimed is:

1. A loom having, in combination, a frame, a knock-off lever mounted on the frame, a shaft, a disk secured thereto having a series of friction members on one surface thereof, a driving pulley capable of movement into engagement with the friction members upon said disk, connections between said pulley and the knock-off lever including a bell crank lever arranged to be moved by the knock-off lever, a pivoted lever connected to the pulley and having a cam surface cooperating with one arm of the bell crank to cause axial movement of the pulley into engagement with the friction members on the disk when the knock-off lever is moved into a position to start the loom, said bell crank lever being provided with an arm that extends approximately at right angles to the portion of said pivoted lever with which it cooperates through said cam surface and having a part to engage and positively actuate the pivoted lever to release the friction driving members.

2. A loom having, in combination, a frame, a knock-off lever, a clutch controlling the operation of the loom, and connections between the knock-off lever and the clutch, including a clutch lever, and a bell crank lever having one arm connected with the knock-off lever and the second arm positioned to extend at approximately right angles to the clutch lever to positively shift the latter to and from the clutch closing position, and a cam connection between said arm and clutch lever and operable to move the latter to its clutch closed position with a quick initial movement and slower final movement and to lock the clutch lever in the clutch closed position.

3. A loom having, in combination, a frame, a driven shaft, a clutch member on the shaft, a driving pulley movably mounted on the shaft having a clutch face for engagement with the clutch face of the shaft member, and having a hub provided with a declutching groove, a clutch lever pivotally mounted close to the pulley, a yoke on the clutch lever, a collar on the pulley hub provided with pins to be engaged by the yoke to move the pulley into clutch closed position, said clutch lever being provided with a declutching member engaging the declutching groove in the pulley hub, and also provided with a cam-shaped end, a second lever provided with two portions to engage the opposite sides of the cam end of the clutch lever, the cam end of the clutch lever being provided with a steep portion and a locking portion on the one side for engagement with one of the projections on the second lever, the steep portion acting to move the lever to cause the pulley to come into contact with the clutch member on the shaft, and the other portion acting to give the pulley its final movement into clutch-closed position, the other portion on the second lever engaging the opposite side of the clutch lever when the second lever is moved in the opposite direction to positively move the clutch lever in the direction to pull the pulley away from the clutch member on the driven shaft.

4. A loom having a driven shaft provided with a clutch member secured to it, a pulley provided with a hub having a declutching groove and a clutching shoulder, a clutch operating lever, a stationary bracket provided with a slot, a second bracket provided with a second slot, a bolt extending through both slots, a sleeve on the bolt forming a pivot, the clutch lever being mounted on the sleeve, one of the brackets being provided with an adjusting screw having its end in engagement with a flange on the sleeve acting when the bolt is loosened and the screw is turned to adjust the position of the sleeve and therefore the position of the pivot of the clutch lever, a collar on the pulley hub adapted to exert clutch closing pressure on the shoulder and provided with pins, the clutch lever being provided with a yoke having slots adapted to receive the pins, the clutch lever also being provided with a declutching member secured to the clutch lever and having a portion engaging the declutching groove in the pulley hub.

5. A loom having, in combination, a frame, a knock-off lever, a clutch for controlling the operation of the loom, and connections between the knock-off lever and clutch for positively closing the clutch as the knock-off lever is moved in one direction and for positively opening the clutch as the knock-off lever is moved in the opposite direction, including a clutch lever operable to open and close said clutch, a lever operable by said knock-off lever and having an arm that extends at approximately right angles to the clutch lever, and a cam for transmitting movement from said arm to the clutch lever and provided with a steep portion for bringing the clutch surfaces quickly into engagement and a less steep portion for exerting a final clutching pressure upon said surfaces and for holding the clutch lever locked in the final clutch applying position, and means associated with said arm for positively moving the clutch lever to the clutch open position.

JONAS NORTHROP.